(12) United States Patent
Welsh et al.

(10) Patent No.: US 9,868,524 B2
(45) Date of Patent: Jan. 16, 2018

(54) UNMANNED AERIAL VEHICLE CONFIGURATION FOR EXTENDED FLIGHT

(71) Applicant: Amazon Technologies, Inc., Seattle, WA (US)

(72) Inventors: Ricky Dean Welsh, Bellevue, WA (US); Daniel Buchmueller, Seattle, WA (US); Fabian Hensel, Zurich (CH); Gur Kimchi, Bellevue, WA (US); Louis LeRoi LeGrand, III, Seattle, WA (US); Brandon William Porter, Yarrow Point, WA (US); Walker Chamberlain Robb, Seattle, WA (US); Joshua White Traube, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/538,570

(22) Filed: Nov. 11, 2014

(65) Prior Publication Data

US 2016/0129998 A1    May 12, 2016

(51) Int. Cl.
*B64C 27/24*    (2006.01)
*B64C 29/00*    (2006.01)
(Continued)

(52) U.S. Cl.
CPC ............ *B64C 39/024* (2013.01); *B64C 27/22* (2013.01); *B64C 27/24* (2013.01);
(Continued)

(58) Field of Classification Search
CPC ......... B64C 27/00; B64C 27/08; B64C 27/20; B64C 27/22; B64C 27/26;
(Continued)

(56) References Cited

U.S. PATENT DOCUMENTS 3,979,658 A * 9/1976 Foster .................. H02J 7/0081
                                                         320/156
6,293,491 B1 * 9/2001 Wobben ................. B64C 27/00
                                                         244/17.23
(Continued)

FOREIGN PATENT DOCUMENTS

DE    102012202698    *    8/2013    ............. B64C 27/08
DE    102012202698 A1    8/2013
(Continued)

OTHER PUBLICATIONS

Ferrell et al. "Dynamic Flight Modeling of a Multi-Mode Flying Wing Quadrotor Aircraft", 2013.
(Continued)

*Primary Examiner* — Richard R Green
(74) *Attorney, Agent, or Firm* — Athorus, PLLC (57) ABSTRACT

This disclosure describes a configuration of an unmanned aerial vehicle (UAV) that will facilitate extended flight duration. The UAV may have any number of lifting motors. For example, the UAV may include four lifting motors (also known as a quad-copter), eight lifting motors (octo-copter), etc. Likewise, to improve the efficiency of horizontal flight, the UAV also includes a pushing motor and propeller assembly that is oriented at approximately ninety degrees to one or more of the lifting motors. When the UAV is moving horizontally, the pushing motor may be engaged and the pushing propeller will aid in the horizontal propulsion of the UAV.

21 Claims, 10 Drawing Sheets (51) Int. Cl.
*B64C 39/02* (2006.01)
*B64C 27/22* (2006.01)

(52) U.S. Cl.
CPC .... *B64C 29/0025* (2013.01); *B64C 2201/027* (2013.01); *B64C 2201/108* (2013.01); *B64C 2201/128* (2013.01); *B64C 2201/165* (2013.01)

(58) Field of Classification Search
CPC ........ B64C 2027/8236; B64C 29/0025; B64C 29/005; B64C 2201/024; B64C 2201/108
See application file for complete search history.

(56) References Cited

U.S. PATENT DOCUMENTS

| | | | |
|---|---|---|---|
| 7,273,195 | B1 | 9/2007 | Golliher |
| 7,911,796 | B2 * | 3/2011 | Vander Ploeg ...... H05K 7/1412 257/727 |
| 8,322,648 | B2 | 12/2012 | Kroetsch et al. |
| 8,485,464 | B2 * | 7/2013 | Kroo .................. B64C 29/0025 244/17.23 |
| 8,596,571 | B2 | 12/2013 | Goelet |
| 8,964,396 | B1 * | 2/2015 | Dailey ................ H05K 7/1492 312/223.2 |
| 9,061,763 | B1 | 6/2015 | Christensen et al. |
| 9,120,560 | B1 * | 9/2015 | Armer .................... B64C 27/08 |
| D751,025 | S | 3/2016 | Howell et al. |
| D756,842 | S | 5/2016 | Ashjaee |
| 9,457,901 | B2 | 10/2016 | Bertrand et al. |
| 2003/0085319 | A1 * | 5/2003 | Wagner ................. B64C 27/20 244/12.3 |
| 2009/0283629 | A1 | 11/2009 | Kroetsch et al. |
| 2011/0042508 | A1 | 2/2011 | Bevirt |
| 2012/0018571 | A1 | 1/2012 | Goelet |
| 2012/0083945 | A1 | 4/2012 | Oakley et al. |
| 2013/0092799 | A1 * | 4/2013 | Tian ...................... B64C 27/26 244/7 R |
| 2013/0134254 | A1 * | 5/2013 | Moore .................... B64D 1/16 244/17.11 |
| 2014/0032034 | A1 | 1/2014 | Raptopoulos et al. |
| 2014/0099853 | A1 | 4/2014 | Condon et al. |
| 2014/0103158 | A1 | 4/2014 | Berry |
| 2014/0131510 | A1 | 5/2014 | Wang et al. |
| 2014/0217230 | A1 * | 8/2014 | Helou, Jr. ............... B64C 25/14 244/17.17 |
| 2014/0231582 | A1 | 8/2014 | Headrick |
| 2015/0175258 | A1 * | 6/2015 | Lee ......................... B64C 27/08 244/17.23 |
| 2016/0207625 | A1 * | 7/2016 | Judas ................. B64C 29/0025 |

FOREIGN PATENT DOCUMENTS

| | | | |
|---|---|---|---|
| GB | 2486448 A | 6/2012 | |
| GB | 2502250 A | 11/2013 | |
| WO | WO 2011149544 A1 * | 12/2011 | ........... B64C 39/028 |
| WO | 2013123944 | 8/2013 | |
| WO | 2014080388 | 4/2015 | |
| WO | 2015135951 A1 | 9/2015 | |

OTHER PUBLICATIONS

International Search Report and Written Opinion for International Application No. PCT/US2015/060023 dated Jan. 27, 2016.

* cited by examiner

UNMANNED AERIAL VEHICLE CONFIGURATION FOR EXTENDED FLIGHT

BACKGROUND

Multi-propeller aerial vehicles (e.g., quad-copters, octo-copters) are becoming more common. All such vehicles require a body configuration that will support the separation of the multiple propellers, the control components, the power supply (e.g., battery), etc. However, there is a balance between weight and duration of flight. As the weight increases, for example to support more components, the flight duration will decrease.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of an unmanned aerial vehicle ("UAV") that will facilitate extended flight duration. The UAV may have any number of lifting motors. For example, the UAV may include four lifting motors (also known as a quad-copter), eight lifting motors (also known as an octo-copter), etc. Likewise, to improve the efficiency of horizontal flight, the UAV also includes a pushing motor and propeller assembly that is oriented at approximately ninety degrees to one or more of the lifting motors, the frame of the UAV and/or the motor arm of the UAV. When the UAV is moving horizontally, the pushing motor may be engaged and the pushing propeller will aid in the horizontal propulsion of the UAV. In some implementations, the rotational speed of the lifting motors may be reduced when the pushing motor is engaged, thereby improving efficiency and reducing power consumption of the UAV. Likewise, in some implementations, the UAV may include a wing to aid in the vertical lift of the UAV while the UAV is moving horizontally.

To further improve the efficiency of the UAV, in some implementations, the frame, motor arms, fuselage, wing, propellers, and/or other components of the UAV may be formed of one or more lightweight materials, such as carbon fiber, graphite, machined aluminum, titanium, fiberglass, etc. As discussed below, in some implementations, the frame may be formed of a thermally conductive material to enable use of the frame for heat dissipation.

Regardless of material, each of the motor arms, motor housing, and/or fuselage may be hollow, thereby reducing weight and providing a cavity through which one or more wires and/or cables may be passed and/or in which other components may be housed. For example, wires that connect the motors (e.g., lifting motors, pushing motors) to components located in or around the frame (e.g., electronic speed control ("ESC")) may be passed through the inner portion of one or more of the motor housings and motor arms.

In some implementations, the UAV assembly may be configured so that the wires passing through the motor housings and/or motor arms have multiple junctions to enable easy disassembly and/or part replacements. For example, the motor wires may be configured with multiple separable junctions. For example, the motor wires may extend from the motor and have a separable junction at or near the end of the motor arm near where the motor is mounted, rather than having only a single junction where the motor wires connect to the ESC. By having a separable junction for the motor wires near the motor, the motor can be easily removed and replaced without having to disassemble any other components (e.g., fuselage, motor arms) of the UAV.

In some implementations, as discussed below, the fuselage may be aerodynamically designed to mount on an underneath or bottom side of the frame and be configured to contain components and power supplies of the UAV. For example, the fuselage may be formed from carbon fiber and mount to ridges or grooves in the frame, as illustrated and discussed below with respect to FIG. 1B.

Figure 1A:
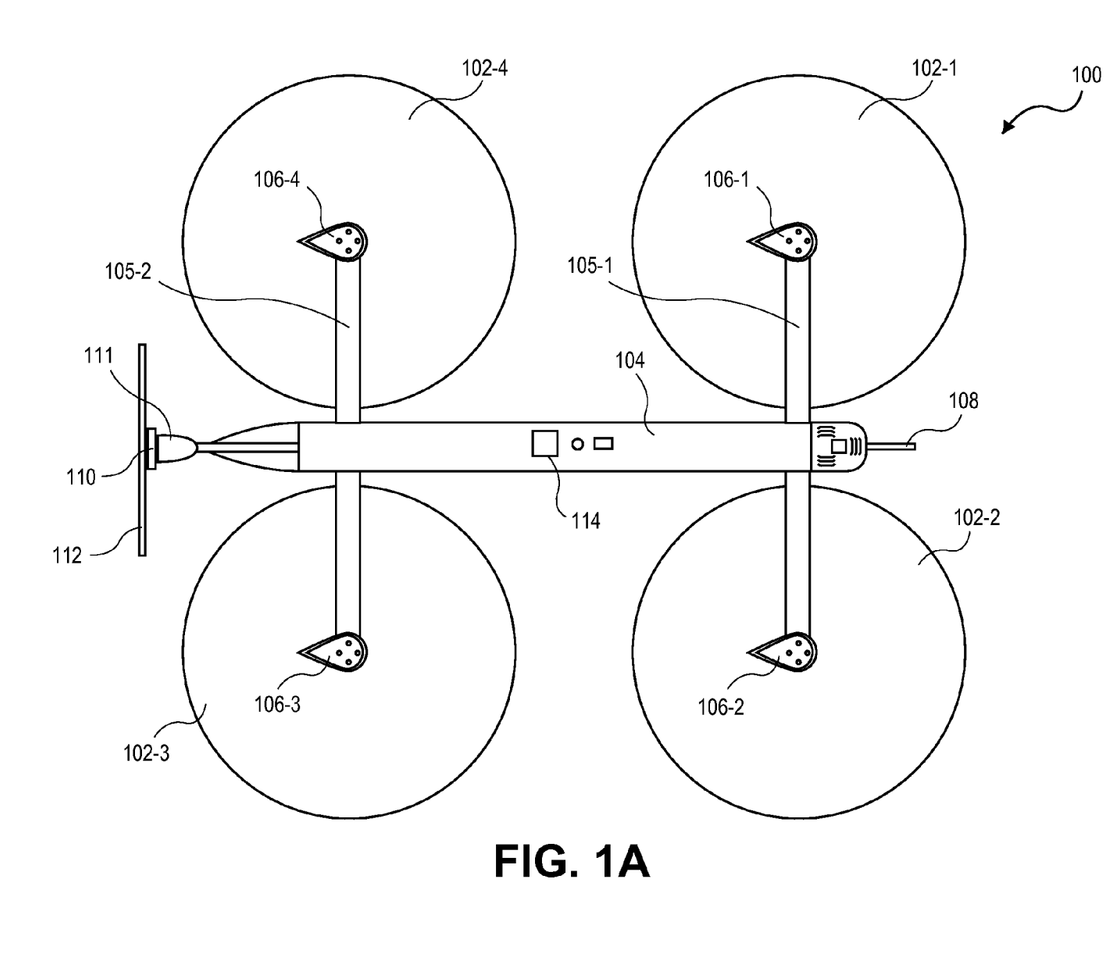
FIG. 1A depicts a block diagram of a top-down view of an unmanned aerial vehicle, according to an implementation.

FIG. 1A illustrates a block diagram of a top-down view of a UAV 100, according to an implementation. As illustrated, the UAV 100 includes a frame 104. The frame 104 or body of the UAV 100 may be formed of any suitable material, such as graphite, carbon fiber, aluminum, etc., or any combination thereof. In this example, the frame 104 of the UAV 100 is formed of machined aluminum in a rectangular shape. As discussed in further detail below with respect to FIG. 5, the underneath or bottom side of the frame 104 may be machined into a grid or hash pattern to reduce the weight of the frame, provide support, and provide locations for mounting other components of the UAV 100.

Mounted to the frame are two motor arms 105-1, 105-2. In this example, the motor arms 105-1, 105-2 are approximately the same length, are arranged substantially parallel to one another and perpendicular to the frame 104. In other implementations, the motor arms 105 may be of different lengths (e.g., the front motor arm 105-1 may be shorter than the rear motor arm 105-2 and/or arranged at different locations on the UAV 100.

Mounted to each end of the motor arms 105 are lifting motor housings 106-1, 106-2, 106-3, 106-4. The lifting motor housings 106 may be formed of any material, such as carbon fiber, aluminum, graphite, etc. In this example, the lifting motor housings 106 are aerodynamically shaped to reduce friction of air flow during horizontal flight of the UAV. The lifting motor housings 106 are discussed further below with respect to FIGS. 6-7.

Figure 6:
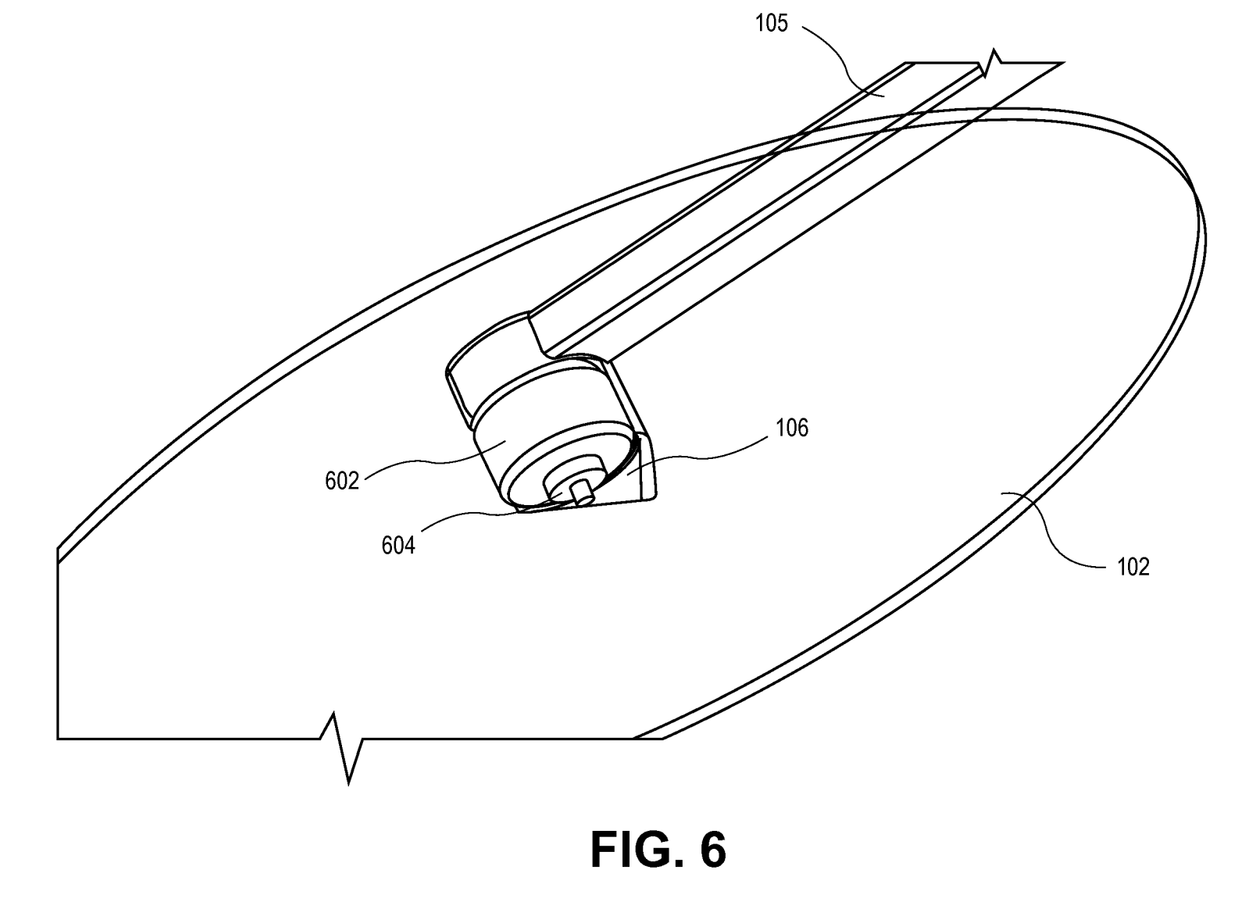
FIG. 6 depicts a lifting motor and lifting motor housing of the unmanned aerial vehicle, according to an implementation.

Mounted inside each lifting motor housing 106 is a lifting motor 602 (not shown in FIG. 1A, but illustrated and discussed in FIG. 6). In one implementation, the lifting motors are mounted so that propeller shaft of the lifting motor that mounts to the propeller 102 is facing downward with respect to the UAV 100. In other implementations, the lifting motors may be mounted with the propeller shaft facing upwards with respect to the UAV 100. In still other implementations, one or more of the lifting motors may be mounted with the propeller shaft facing downward and one or more of the lifting motors may be mounted with the propeller shaft facing upward. In other implementations, the lifting motors may be mounted at other angles with respect to the frame of the UAV 100. The lifting motors may be any form of motor capable of generating enough rotational speed with the propellers to lift the UAV 100 and any engaged payload, thereby enabling aerial transport of the payload. For example, the lifting motors may each be a FX-4006-13 740 kv multi-rotor motor, or a Tiger U-11 motor.

Mounted to each lifting motor is a lifting propeller 102-1, 102-2, 102-3, 102-4. The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-nine inches. While the illustration of FIG. 1 shows the lifting propellers 102 all of a same size, in some implementations, one or more of the lifting propellers 102 may be different sizes and/or dimensions. Likewise, while this example includes four lifting propellers, in other implementations, more or fewer propellers may be utilized as lifting propellers. Likewise, in some implementations, the propellers may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide thrust for the UAV.

Mounted to a first end, or front end, of the frame 104 of the UAV 100 is one or more antennas 108. The antennas 108 may be used to transmit and/or receive wireless communications. For example, the antennas 108 may be utilized for Wi-Fi, satellite, near field communication ("NFC"), cellular communication, or any other form of wireless communication. Other components, such as cameras, time of flight sensors, distance determining elements, gimbals, etc. may likewise be mounted to the front of the frame 104 of the UAV 100.

Mounted to a second end, or rear end, of the frame 104 of the UAV 100 is a pushing motor housing 111, a pushing motor 110 and a pushing propeller 112. While the term "pushing motor" is used, those having ordinary skill will appreciate that the position of motor 110 and antennas 108 may be reversed and reconfigured such that pushing motor 110 actually "pulls" the UAV 100 in a horizontal direction rather than pushes it. As such, as used herein, the term pushing motor shall be construed to include implementations configured for either "push" horizontal thrust or "pull" horizontal thrust. The pushing motor housing 111 may be aerodynamically shaped and configured to encase the pushing motor 110. The pushing motor 110 and the pushing propeller 112 may be the same or different than the lifting motors and lifting propellers 102. For example, in some implementations, the pushing motor 110 may be a Tiger U-8 motor and the pushing propeller 112 may have a dimension of eighteen inches. In some implementations, the pushing propeller may have a smaller dimension than the lifting propellers.

The pushing motor 110 and pushing propeller 112 may be oriented at approximately ninety degrees with respect to the frame 104 of the UAV 100 and utilized to increase the efficiency of flight that includes a horizontal component. For example, when the UAV 100 is traveling in a direction that includes a horizontal component, the pushing motor 110 may be engaged to provide horizontal thrust force via the pushing propeller to propel the UAV 100 horizontally. As a result, the speed and power utilized by the lifting motors may be reduced. Alternatively, in selected implementations, the pushing motor 110 may be oriented at an angle greater or less than ninety degrees with respect to frame 104 to provide a combination of pushing and lifting thrust.

One or more navigation components 114, such as a global positioning receiver/transmitter, may also be mounted to the top of the frame 104.

Figure 1B:
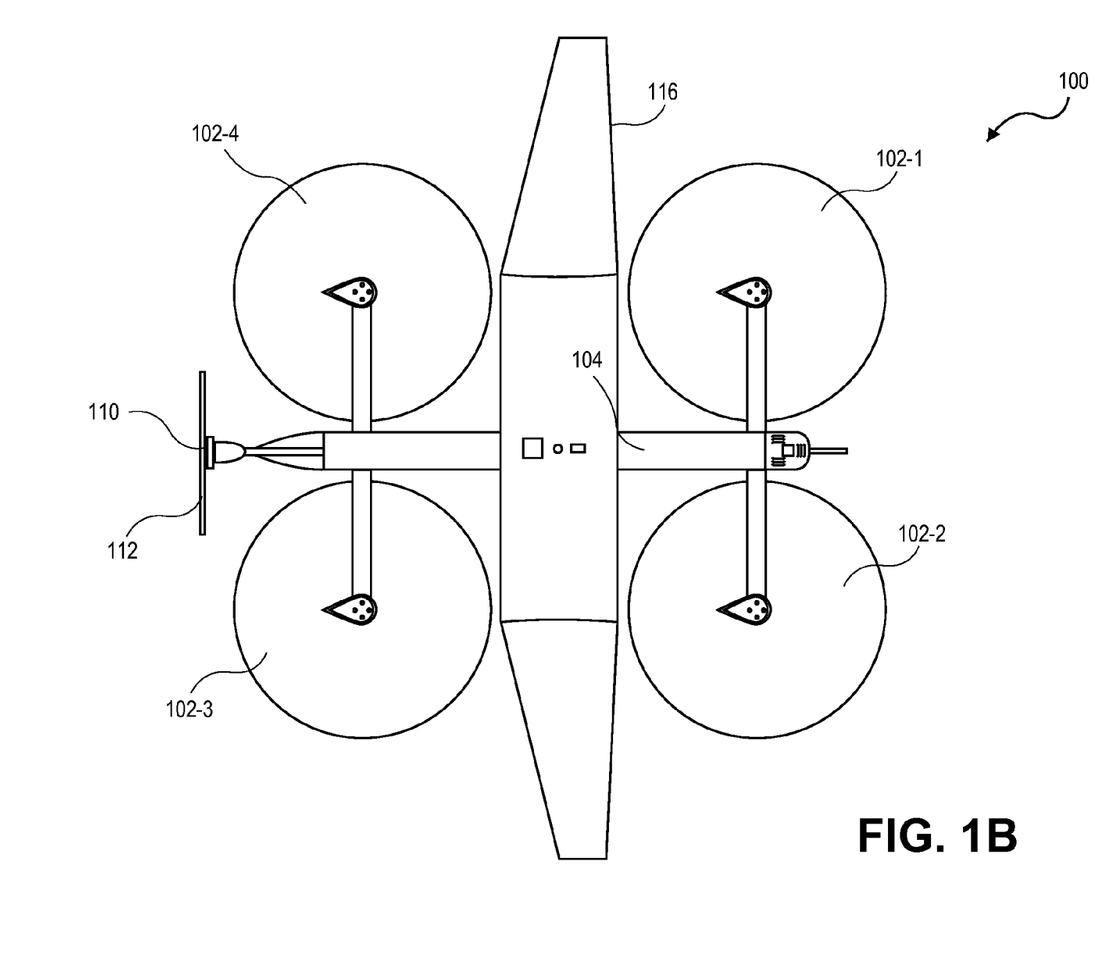
FIG. 1B depicts a block diagram of a top-down view of an unmanned aerial vehicle, according to an implementation.

FIG. 1B depicts another block diagram of a top-down view of a UAV 100, according to an implementation. In the example illustrated in FIG. 1B, the UAV 100 includes a wing 116 coupled to the frame of the UAV 100. The wing may be formed of any suitable material such as, but not limited to, carbon fiber, aluminum, fabric, plastic, fiberglass, etc. The wing 116 may be coupled to the top of the frame 104 and positioned between the lifting motors 102. In other implementations, the wing 116 may be position above the lifting motors and/or lifting propellers.

The wing is designed to have an airfoil shape to provide lift to the UAV 100 as the UAV 100 moves horizontally. In some implementations, utilizing the pushing motor 110 and pushing propeller 112 in conjunction with the wing 116, when the UAV 100 is moving in a direction that includes a horizontal component, the rotational speed of the lifting motors and lifting propellers 102 may be reduced or eliminated as the wing 116 may provide lift and keep the UAV 100 airborne when thrust in a horizontal direction by the pushing motor 110 and pushing propeller 112 is applied. In implementations where the wing includes flaps and/or ailerons, the pitch, yaw and roll of the UAV 100 may be controlled using the flaps and/or ailerons alone or in combination with the lifting motors and lifting propellers 102. If the wing does not include flaps and/or ailerons, the lifting motors and lifting propellers 102 may be utilized to control the pitch, yaw, and roll of the UAV 100 during flight. In some implementations, the wing 116 may be configured to rotate or pivot about the frame 104 of the UAV to reduce drag when the UAV 100 is moving a direction that includes a vertical component.

Figure 2:
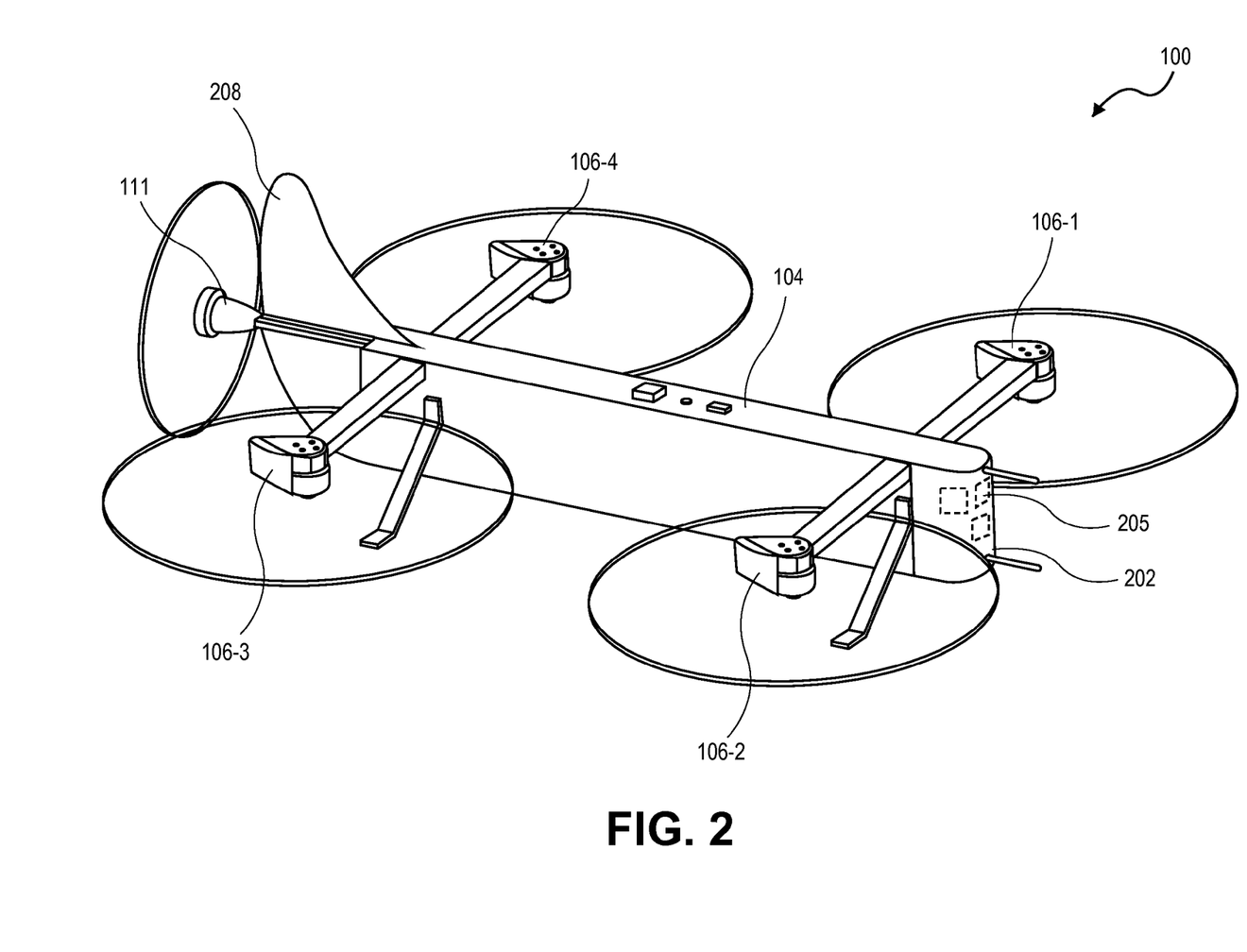
FIG. 2 depicts another view of an unmanned aerial vehicle, according to an implementation.

FIG. 2 depicts another view of a UAV 100, according to an implementation. As illustrated in FIG. 2, the UAV 100 may be configured for aerodynamics. For example, a fuselage 202 may be included on the UAV 100, mounted to the frame 104 and extending downward and around many of the components of the UAV 100. The fuselage 202 may be made of any suitable material(s) such as graphite, carbon fiber, aluminum, fiberglass, etc.

The fuselage 202 may encompass one or more power supply containers 204 (FIG. 3), a payload (not shown), and/or the components of the UAV control system 205. The fuselage 202 may be coupled to the sides of the frame using one or more attachment mechanisms, such as screws, rivets, latches, quarter-turn fasteners, etc. In some implementations, the attachment mechanisms may be configured to enable easy removal and reattachment of the fuselage to facilitate power supply and/or power supply container replacement and maintenance to the UAV control system.

The payload, such as a package or item to be delivered to a user, may be configured to fit within the fuselage 202, such as between two power supply containers, and be removably coupled to the frame 104 of the UAV. In other implementations, the payload may form a portion of the fuselage. For example, the fuselage may include a gap or opening and when the payload is coupled to the frame 104 of the UAV 100 the sides of the payload may complete the fuselage 202.

As discussed above, and further illustrated in FIG. 2, the motor housings 106-1, 106-2, 106-3, 106-4, 111 have an aerodynamic shape to improve the overall aerodynamics of the UAV when the UAV is traveling horizontally. For example, the motor housings 106-1, 106-2, 106-3, 106-4 for the lifting motors may be tapered toward the rear of the UAV 100. Likewise, the motor housing 111 may be cone shaped with the narrow end of the cone directed toward the nose of the UAV 100. In some implementations, the motor arms 105 may also have an aerodynamic form. For example, the motor arms 105 may be tapered toward the rear (e.g., "teardrop" shaped) of the UAV 100 and/or may have an airfoil design to provide additional lift to the UAV 100 when the UAV 100 moves horizontally.

The UAV may also include a vertical stabilizer 208 extending upward from the top of the frame 104. The vertical stabilizer 208 may also include a rudder (not shown) that can be controlled by the UAV control system to adjust the yaw of the UAV. Likewise, in some implementations, the UAV 100 may also include horizontal stabilizers (not shown) which may include elevators controlled by the UAV control system to adjust the pitch of the UAV 100.

Figure 3:
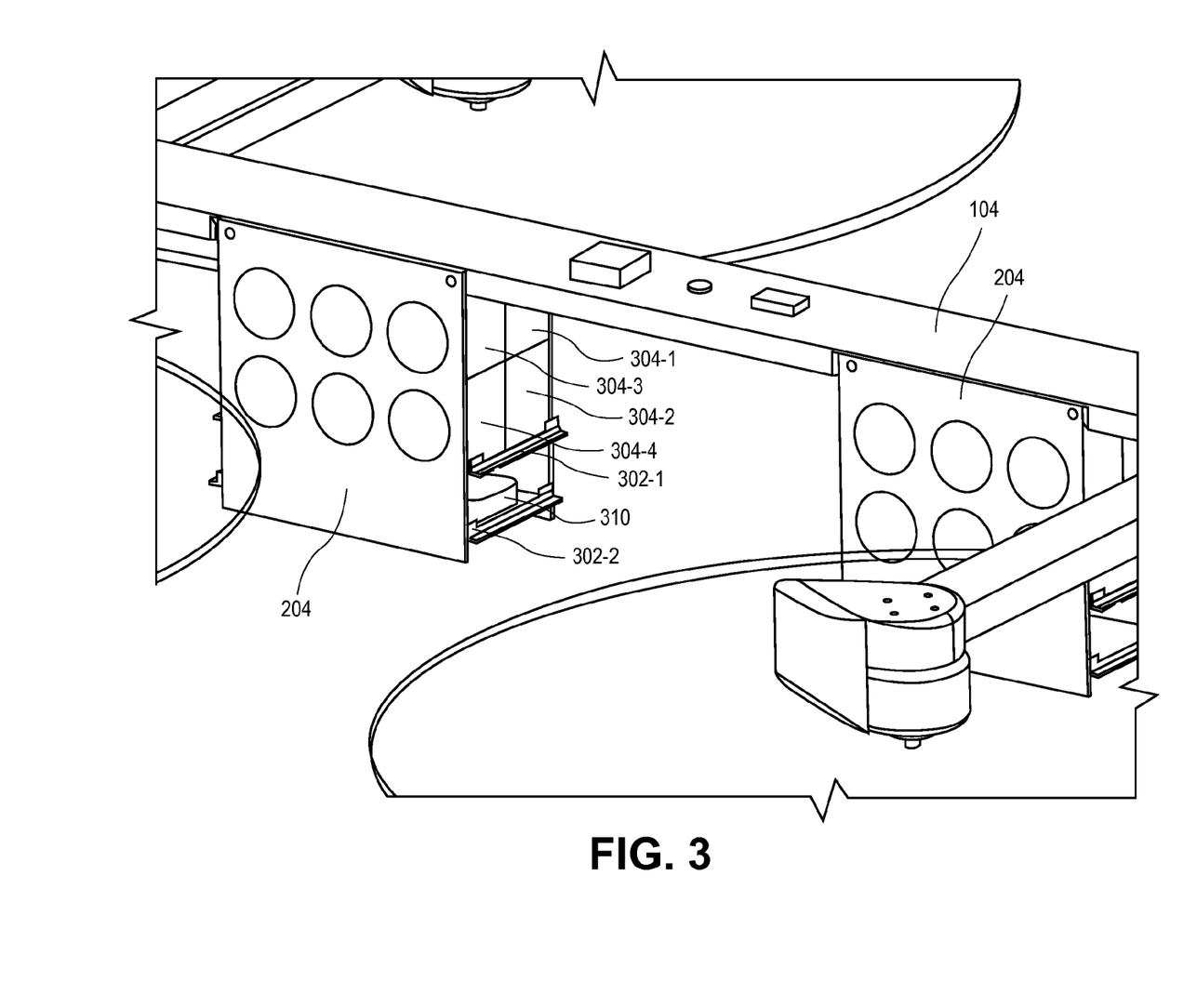
FIG. 3 depicts a view of a power supply container of an unmanned aerial vehicle coupled to a frame of the unmanned aerial vehicle, according to an implementation.

FIG. 3 depicts a view of the UAV 100 with the fuselage 202 removed, exposing two power supply containers 204 of the UAV 100 coupled to the frame 104 of the UAV 100, according to an implementation. As illustrated, the frame 104 may include one or more grooves or indents into which the power supply containers 204 may be positioned and attached to the frame 104. In some implementations, the grooves of the frame 104 may be angled and designed to provide a friction fit with the power supply containers. In other implementations, the power supply containers 204 may be removably mounted to the frame 104 using screws, rivets, quarter-turn fasteners, or other attachment mechanisms. In still other implementations, the power supply containers 204 may be permanently mounted to the frame 104 and/or formed as part of the frame 104.

Figure 4:
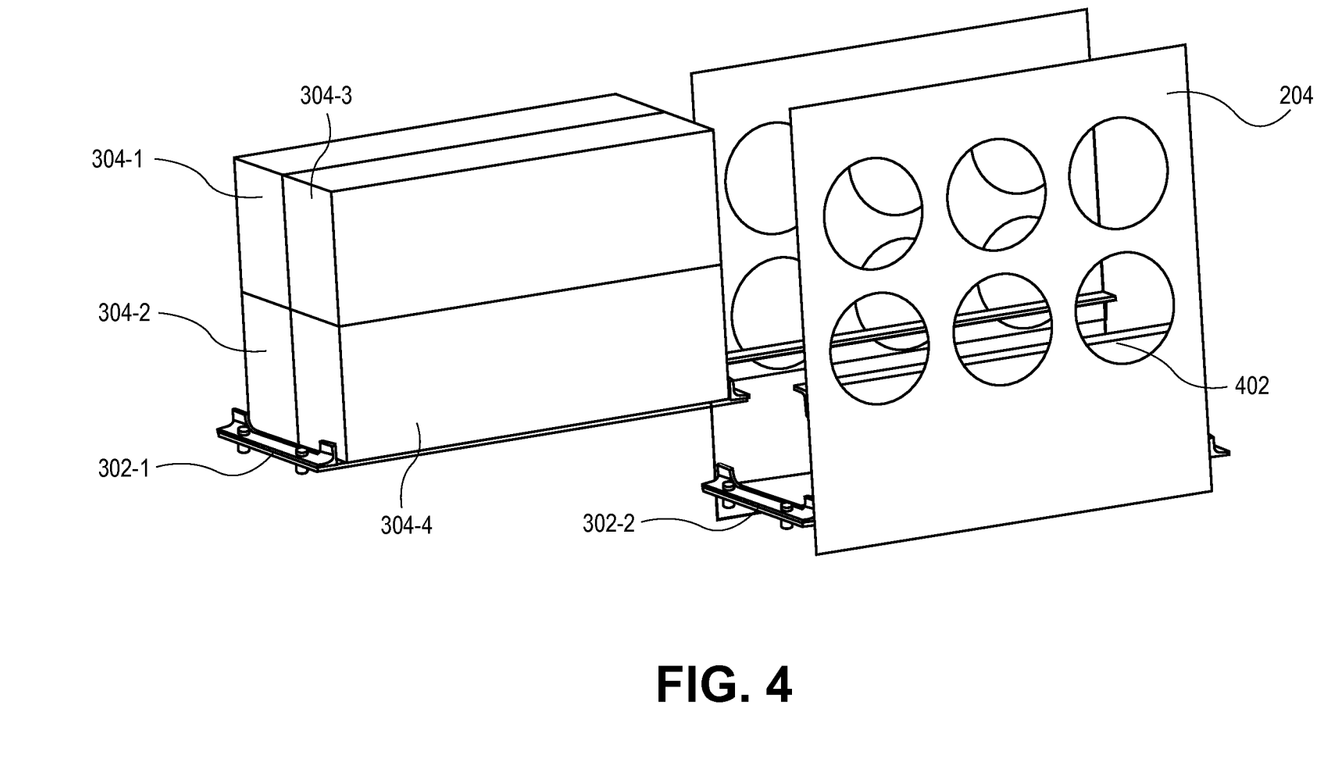
FIG. 4 depicts a view of a power supply container of the unmanned aerial vehicle, according to an implementation.

The power supply containers 204 may include one or more shelves 302 that may be positioned within the power supply container 204. Referring to FIG. 4, the shelves 302-1, 302-3 may be removable from the power supply containers 204. For example, the shelves 302 may be designed to mount or fit in the power supply container 204 on rails 402. The rails 402 and shelves 302 may be movable horizontally and/or vertically to facilitate placement of different size power supplies and/or other components. For example, as illustrated in FIGS. 3-4, the shelf 302-1 is supporting four power supplies 304-1, 304-2, 304-3, 304-4. The power supplies 304 may be in the form of battery power, solar power, gas power, super capacitor, fuel cell, alternative power generation source, or a combination thereof. For example, the power supplies 304 may each be a 6000 mAh lithium-ion polymer battery, polymer lithium ion (Li-poly, Li-Pol, LiPo, LIP, PLI or Lip) battery, etc.

The power supplies 304 may be individually removed and/or the entire shelf 302 may be removed with all of the supporting power supplies, as illustrated in FIG. 4. Likewise, the power supply containers 204 may include one or more openings (e.g., holes) on the sides of the power supply container to facilitate heat dissipation from the supported power supplies and/or other components.

The shelves of the power supply containers 204 may also support other components. For example, one or more components of the UAV control system 310 may be included on the shelves 302 of the power supply containers 204, as illustrated in FIG. 3. Likewise, a power distribution unit to which the power supplies 304 are connected may be supported by one of the shelves of the power supply container. For example, the power distribution unit may be mounted to a shelf of the power supply container 204 and all of the power supplies may be coupled to the power distribution unit. The power distribution unit may then be coupled to the UAV control system 310 and/or other components of the UAV to provide power. In some implementations, the connection between the power distribution unit and the UAV control system may be a single coupling, such as a magnetic coupling, male/female connection, etc. to facilitate complete exchange of the power supply container 204.

Figure 9:
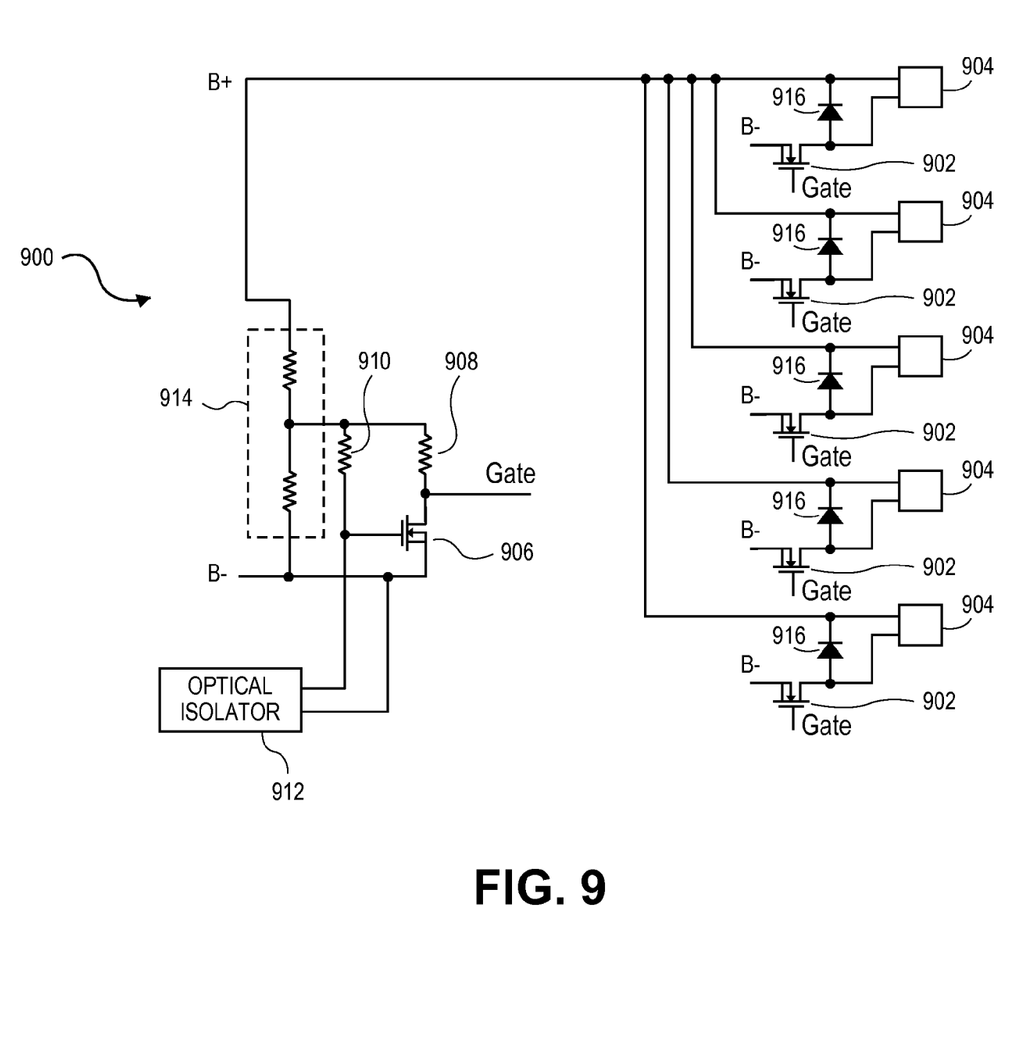
FIG. 9 is a block diagram of a protection circuit, according to an implementation.

Referring to FIG. 9, in some implementations, the power distribution unit may include or be coupled with a protection circuit 900 that operates as both a spark suppression circuit to protect the UAV 100 when power is applied, and a shut-off or kill-switch circuit to shut down the UAV 100 by removing power. For example, the positive lead of the power supply(s) may be coupled to the protection circuit 900 and a positive node of each ESC component 904. The second or negative node of each ESC component 904 is coupled to the protection circuit 900 which controls power to the ESC components 904. Specifically, each second node of each ESC component 904 may be coupled to a respective drain of a transistor 902, such as a metal-oxide-semiconductor field-effect transistor (MOSFET) transistor, of the protection circuit 900. The source of each of the transistors 902 is coupled to ground and each gate of the transistors 902 is coupled to a drain of a transistor 906 and a resistor 908. The resistor 908 is used to control the time it takes for each of the transistors 902 to transition from an off state to an on state. The gate of transistor 906 is coupled to a second resistor 910 and an optical isolator 912. When the optical isolator is off, the transistor 910 pulls-up transistor 906 into an on state by drawing voltage from the voltage divider 914.

When the optical isolator is in an off state, the gate of transistor 906 is high (transistor 906 is on) which causes the transistors 902 to be in an off state and no power is applied to the ESCs. When the optical isolator 912 is activated, it causes the gate of transistor 906 to go low (transistor 904 is off), which, in turn, causes the gate node of each transistor 902 to charge through resistor 908 until the transistors 902 reach a threshold voltage for the transistor 902. By altering the size of the transistor 906 and/or the size of the resistor 908, the speed at which the transistors 902 transition from off, through their linear states and to their on states may be controlled, thereby providing spark suppression to protect the ESCs when power is first applied to the ESCs.

To control the timing of transition for transistors 902, the resistor 908 and resistor 910 must be sufficiently large (e.g., 100,000-500,000 ohms) so as not to affect the voltage divider 914. The resistor 910 is also larger than resistor 908. In one implementation, resistor 910 is three times as large as resistor 908. Likewise, the transistor 906 is generally smaller than transistors 902.

The protection circuit 900 also operates as a shut-off or kill switch circuit by quickly removing power from the ESCs. The kill switch may be used, for example, when an operator loses control of the UAV. To quickly remove power, the optical isolator 912 is shut off, which causes the gate on transistor 906 to go high. When the gate on transistor 906 goes high, the gates of transistors 902 go low and the transistors 902 shut off, thereby removing power from the ESCs 904. Likewise, a diode 916 may be coupled to the drain of each transistor 902 to receive current when power is removed, thereby protecting the transistors 902.

The protection circuit 900 is designed so that, comparatively, power is applied to the ESCs in a controlled manner, thereby providing spark suppression, but removed quickly, thereby providing a shut-off or kill switch circuit.

Figure 5:
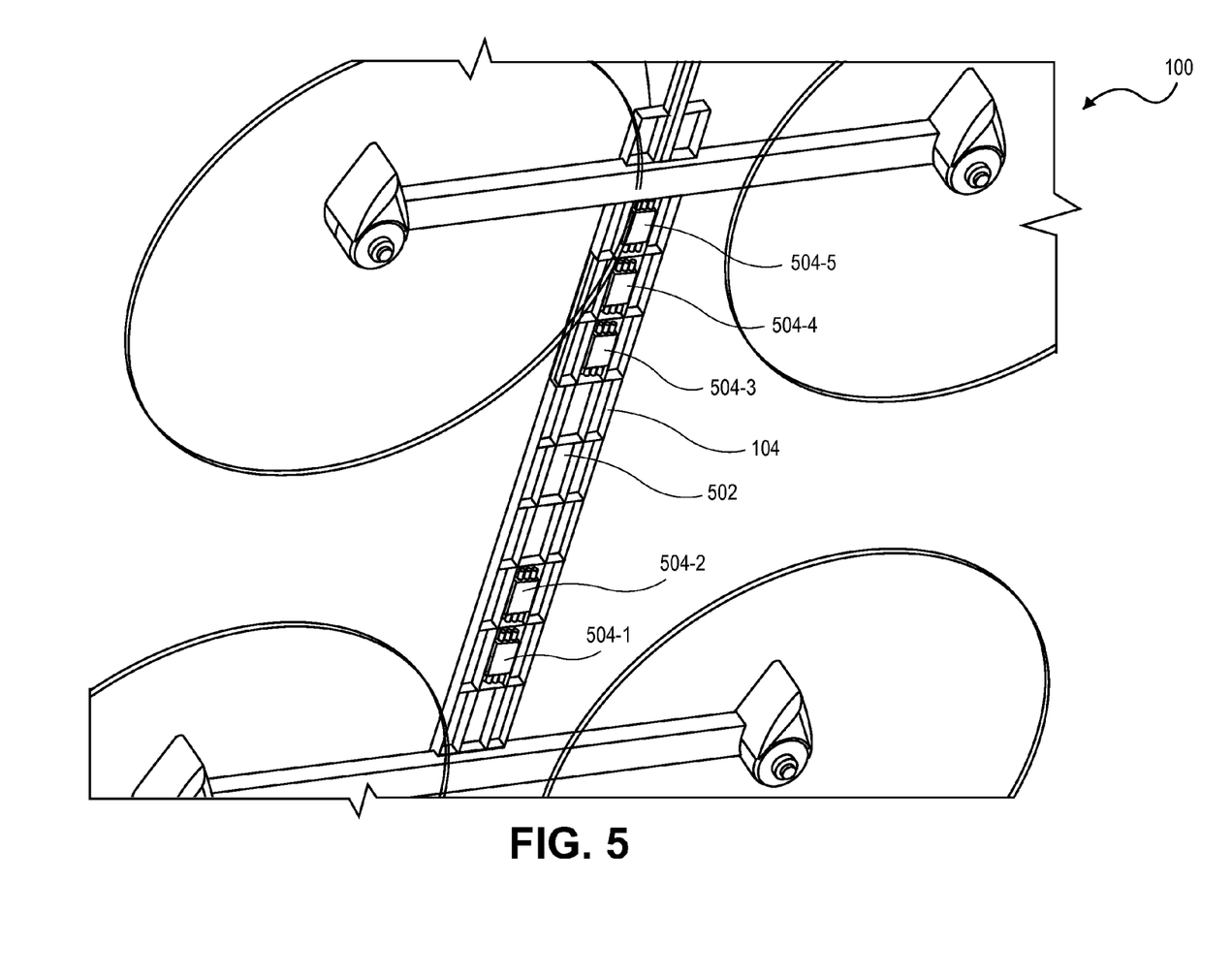
FIG. 5 depicts a bottom view of a frame of the unmanned aerial vehicle, according to an implementation.

FIG. 5 depicts an underneath or bottom view of a frame 104 of a UAV 100, according to an implementation. As discussed above, the frame 104 may be formed of any suitable material, including but not limited to, carbon fiber, graphite, steel, machined aluminum, titanium, fiberglass and/or any other material or combination of materials. Likewise, the frame 104 may be machined to reduce the weight of the frame 104. For example, as illustrated in FIG. 5, the underneath side of the frame 104 may be machined into a hash pattern. The groves or open spaces 502 in the hash pattern may be formed of a size sufficient to position one or more components of the UAV and/or components of the UAV control system. For example, the electronic speed control (ESC) components 504-1, 504-2, 504-3, 504-4, 504-5 may be positioned in the open spaces 502 of the frame. In some implementations, the frame 104 may also operate as a heat sink to dissipate heat from the components mounted to the frame.

For example, components of the UAV control system 610, such as the ESC components 504 may be thermally coupled to the frame 104 using a thermal grease. The thermal grease, also known as thermal gel, thermal compound, thermal paste, heat paste, heat sink paste, heat transfer compound, heat transfer paste (HTP) or heat sink compound, is a viscous fluid substance which improves thermal transfer between the components and the frame 104. The thermal grease may comprise a ceramic, metal, carbon, graphite, liquid metal, phase change metal alloy (PCMA) and other similar materials. In other implementations thermally conductive pads may be used to provide thermal coupling between the frame 104 and the components. The frame 104 may also be used to dissipate heat from other components, such as the power supply.

FIG. 6 depicts a lifting motor 602 and a motor housing 106 of a UAV, according to an implementation. As discussed above, the motor housing 106 is mounted to the end of a motor arm 105 and houses a lifting motor 602. In some implementations, the lifting motor 602 and motor housing 106 may be secured to the motor arm using screws. For example, mounting screws for the lifting motor may be threaded through the motor housing, through the motor arm and into the lifting motor to secure each component together.

In one implementation, the lifting motors are mounted so that propeller shaft 604 of the lifting motor that mounts to the propeller 102 is facing downward with respect to the UAV. In other implementations, the lifting motor may be mounted with the propeller shaft 604 facing upwards with respect to the UAV. The lifting motors 602 may be any form of motor capable of generating enough rotational speed with the propellers to lift the UAV and any engaged payload, thereby enabling aerial transport of the payload. For example, the lifting motors 602 may each be a FX-4006-13 740 kv multi-rotor motor, or a Tiger U-11 motor.

Figure 7:
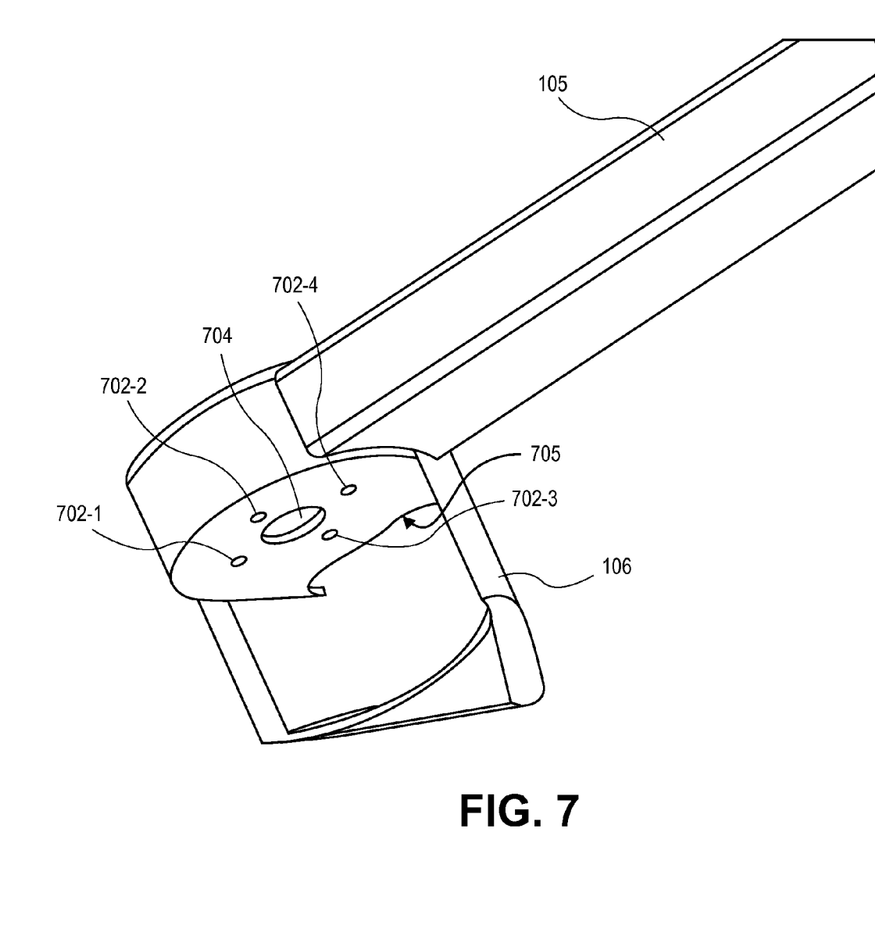
FIG. 7 depicts a lifting motor housing of the unmanned aerial vehicle, according to an implementation.

FIG. 7 depicts a lifting motor housing 106 of a UAV with the lifting motor removed, according to an implementation. As discussed above, the lifting motor housing 106 may be positioned on an end of the motor arm 105 and secured to the motor arm 105 using screws of the lifting motor. For example, four screws may be threaded through a top side (not shown) of the motor housing 106, through screw holes (not shown) in the motor arm 105 and through the lower screw holes 702-1, 702-2, 702-3, 702-4 of the lower side of the motor housing. The screws may then be screwed into the lifting motor to secure each of the components together. The wires of the lifting motor may be routed through the opening 704 in the motor housing 106 and through the internal cavity of the motor arm 105. Alternatively, the wires of the lifting motor may be routed through the opening 705 in the back of the motor housing 106 and through the internal cavity of the motor arm 105. In still another implementation, the wires may be affixed to an external portion of the motor arm 105.

Figure 8:
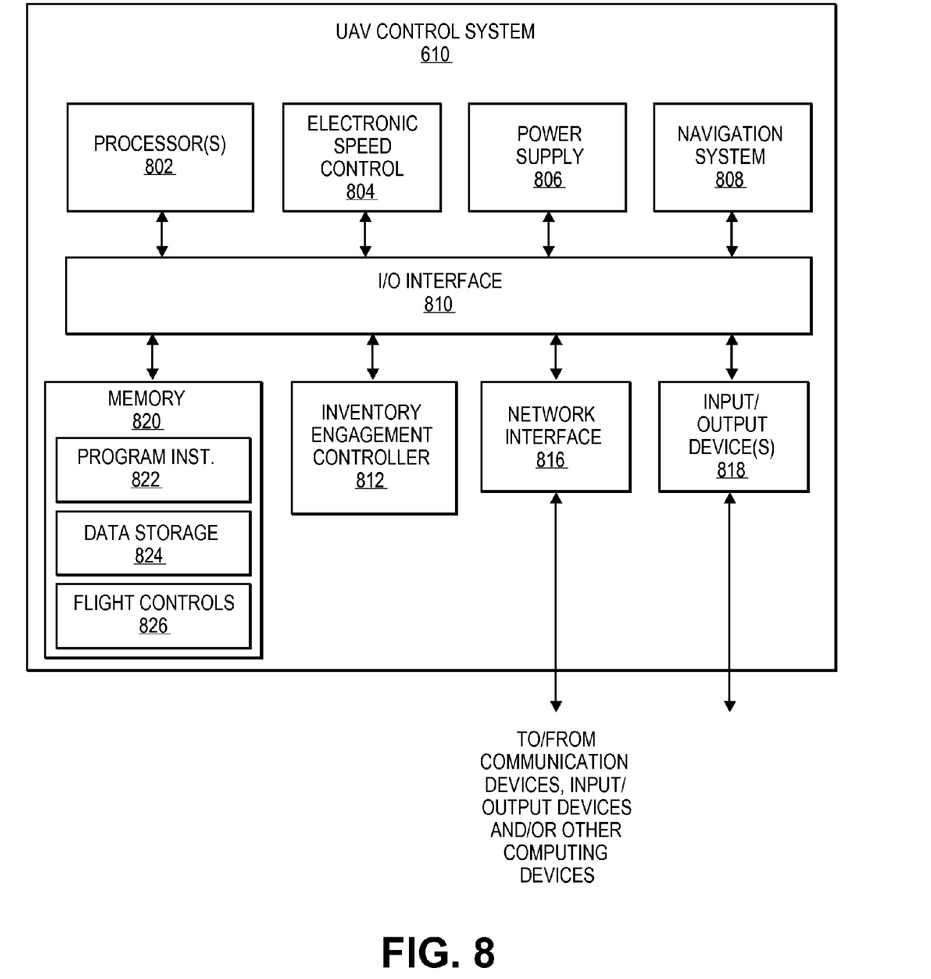
FIG. 8 is a block diagram of an illustrative implementation of a server system that may be used with various implementations.

FIG. 8 is a block diagram illustrating an example UAV control system 610 of the UAV 100. In various examples, the block diagram may be illustrative of one or more aspects of the UAV control system 610 that may be used to implement the various systems and methods discussed herein and/or to control operation of the UAV 100. In the illustrated implementation, the UAV control system 610 includes one or more processors 802, coupled to a memory, e.g., a non-transitory computer readable storage medium 820, via an input/output (I/O) interface 810. The UAV control system 610 may also include electronic speed controls 804 (ESCs), power supply modules 806 and/or a navigation system 808. The UAV control system 610 further includes a payload engagement controller 812, a network interface 816, and one or more input/output devices 818.

In various implementations, the UAV control system 610 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, flight control parameters, component adjustment information, center of gravity information, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824 and flight controls 826, respectively. In other implementations, program instructions, data and/or flight controls may be received, sent or stored upon different types of computer-accessible media, such as non-transitory media, or on similar media separate from the non-transitory computer readable storage medium 820 or the UAV control system 610. Generally speaking, a non-transitory, computer readable storage medium may include storage media or memory media such as magnetic or optical media, e.g., disk or CD/DVD-ROM, coupled to the UAV control system 610 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The ESCs 804 communicate with the navigation system 808 and adjust the rotational speed of each lifting motor and/or the pushing motor to stabilize the UAV and guide the UAV along a determined flight path.

The navigation system 808 may include a global positioning system (GPS), indoor positioning system (IPS), or other similar system and/or sensors that can be used to navigate the UAV 100 to and/or from a location. The payload engagement controller 812 communicates with the actuator(s) or motor(s) (e.g., a servo motor) used to engage and/or disengage items.

The network interface 816 may be configured to allow data to be exchanged between the UAV control system 610, other devices attached to a network, such as other computer systems (e.g., remote computing resources), and/or with UAV control systems of other UAVs. For example, the network interface 816 may enable wireless communication between the UAV 100 and a UAV control system that is implemented on one or more remote computing resources. For wireless communication, an antenna of an UAV or other communication components may be utilized. As another example, the network interface 816 may enable wireless communication between numerous UAVs. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 818 may, in some implementations, include one or more displays, imaging devices, thermal sensors, infrared sensors, time of flight sensors, accelerometers, pressure sensors, weather sensors, etc. Multiple input/output devices 818 may be present and controlled by the UAV control system 610. One or more of these sensors may be utilized to assist in landing as well as to avoid obstacles during flight.

As shown in FIG. 8, the memory may include program instructions 822, which may be configured to implement the example routines and/or sub-routines described herein. The data storage 824 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 610 is merely illustrative and is not intended to limit the scope of the present disclosure. In particular, the computing system and devices may include any combination of hardware or software that can perform the indicated functions. The UAV control system 610 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 610. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the UAV control system 610 may be transmitted to the UAV control system 610 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An unmanned aerial vehicle (UAV), comprising:
   a frame;
   a first lifting motor coupled to the frame;
   a second lifting motor coupled to the frame;
   a pushing motor coupled to the frame;
   a fuselage coupled to the frame and extending downward from the frame, wherein the fuselage encompasses a plurality of components of the UAV and is configured to reduce aerodynamic resistance of the UAV when the UAV is flown in a direction including a horizontal component;
   a first power supply container coupled to the frame at a first position;
   a second power supply container coupled to the frame at a second position; and
   an unmanned aerial vehicle control system configured to send control signals to the first lifting motor, the second lifting motor and the pushing motor in response to signals received from a remote location; and
   wherein:
     the frame includes a payload receiving area between the first power supply container and the second power supply container that receives a payload;
     the fuselage includes a downward-facing gap or opening within which the payload, when received, is at least partially contained; and
     the payload includes an item to be delivered to a user.

2. The UAV of claim 1, further comprising:
   a wing coupled to the frame, wherein the wing is configured to provide lift as the UAV is flown in a direction including a horizontal component.

3. The UAV of claim 1, further comprising:
   a first motor housing coupled to the frame and the first lifting motor, the first motor housing having a tapered shape to reduce an aerodynamic resistance of the first lifting motor.

4. The UAV of claim 1, further comprising:
   a first lifting propeller coupled to the first lifting motor; and
   a first pushing propeller coupled to the pushing motor.

5. The UAV of claim 4, wherein:
   the first lifting propeller has a first dimension;
   the first pushing propeller has a second dimension; and
   the first dimension is larger than the second dimension.

6. The UAV of claim 1, wherein:
   the pushing motor is a different motor size than at least one of the first lifting motor or the second lifting motor.

7. The UAV of claim 1, wherein:
   the frame is configured to dissipate heat from the first power supply container and the second power supply container; and
   at least one component of the unmanned aerial vehicle control system is thermally coupled to the frame with at least one of a thermal grease or thermal pad positioned between the at least one component and the frame such that the thermal grease or the thermal pad improves a thermal transfer between the at least one component and the frame.

8. The UAV of claim 1, wherein the unmanned aerial vehicle control system is further configured to send control signals to at least one of the first lifting motor, the second lifting motor, or the pushing motor in response to signals received from a device of the UAV.

9. An unmanned aerial vehicle (UAV), comprising:
   a frame;
   a first motor arm having a first end and a second end, the first motor arm coupled to the frame;
   a second motor arm having a third end and a fourth end, the second motor arm coupled to the frame;
   a first lifting motor coupled to the first end of the first motor arm;
   a second lifting motor coupled to the second end of the first motor arm;
   a third lifting motor coupled to the third end of the second motor arm;
   a fourth lifting motor coupled to the fourth end of the second motor arm;
   a pushing motor coupled to a fifth end of the frame and configured to provide horizontal propulsion to the UAV;
   a first power supply container coupled to the frame at a first position;
   a second power supply container coupled to the frame at a second position; and
   an unmanned aerial vehicle control system for controlling a rotational speed of at least one of the first lifting motor, the second lifting motor, the third lifting motor, the fourth lifting motor or the pushing motor, wherein:
     the frame includes a payload receiving area including a downward-facing gap or opening within which a payload, when received, is at least partially contained, the payload receiving area being positioned between the first power supply container and the second power supply container; and
     the payload includes an item to be delivered to a user.

10. The UAV of claim 9, wherein the first power supply container and the second power supply container are each removably coupled to the frame and configured to house at least one power supply for providing power to the UAV.

11. The UAV of claim 10, further comprising:
    a fuselage coupled to the frame and extending downward from the frame, wherein;
    the fuselage encompasses at least a portion of the first power supply container and the second power supply container; and
    the fuselage is configured to reduce aerodynamic resistance of the UAV when flown in a direction including a horizontal component.

12. The UAV of claim 10, wherein the first power supply container and the second power supply container each includes a removable shelf configured to support at least one power supply or a component of a control system of the UAV.

13. The UAV of claim 9, further comprising:
a wing coupled to the frame, wherein the wing is configured to provide lift as the UAV is flown in a direction including a horizontal component.

14. The UAV of claim 9, further comprising:
a fuselage coupled to the frame and extending downward from the frame, wherein the fuselage encompasses a plurality of components of the UAV and is configured to reduce aerodynamic resistance of the UAV when the UAV is flown in a direction including a horizontal component; and
the fuselage includes the downward-facing gap or opening within which the payload, when received, is at least partially contained.

15. The UAV of claim 9, further comprising:
a first lifting motor housing coupled to the first end of the first motor arm and formed around the first lifting motor, the first lifting motor housing having a tapered shape to reduce an aerodynamic resistance of the first lifting motor.

16. An unmanned aerial vehicle (UAV), comprising:
a frame;
a first lifting motor coupled to the frame;
a pushing motor coupled to the frame;
a first power supply container coupled to the frame at a first position;
a second power supply container coupled to the frame at a second position;
a wing coupled to the frame and configured to provide lift when the UAV is moving in a direction that includes a horizontal component;
a fuselage coupled to the frame and extending downward from the frame, wherein the fuselage encompasses a plurality of components of the UAV and is configured to reduce aerodynamic resistance of the UAV when the UAV is flown in a direction including a horizontal component; and
wherein:
the frame includes a payload receiving area between the first power supply container and the second power supply container that receives a payload;
the fuselage includes a downward-facing gap or opening within which the payload, when received, is at least partially contained; and
the payload includes an item to be delivered to a user.

17. The UAV of claim 16, wherein the wing is positioned between the first lifting motor and a second lifting motor.

18. The UAV of claim 16, further comprising:
an unmanned aerial vehicle control system; and
wherein:
at least one component of the unmanned aerial vehicle control system is thermally coupled to the frame with at least one of a thermal grease or thermal pad positioned between the at least one component and the frame such that the thermal grease or the thermal pad improves a thermal transfer between the at least one component and the frame; and
the frame dissipates heat generated by the at least one component of the unmanned aerial vehicle control system.

19. The UAV of claim 18, wherein the at least one component includes an electronic speed control component.

20. The UAV of claim 16, further comprising:
a protection circuit configured to operate as a spark suppression circuit for protecting at least a portion of the UAV when power is applied and a kill switch for removing power from at least a portion of the UAV.

21. The UAV of claim 16, further comprising:
a payload engagement controller that communicates with at least one component of the UAV to control an engagement and disengagement of the payload.

* * * * *